(12) United States Patent
Park et al.

(10) Patent No.: US 8,240,196 B2
(45) Date of Patent: Aug. 14, 2012

(54) BRAKE PEDAL STROKE SENSOR

(75) Inventors: Joon Young Park, Seongnam-si (KR); Eansoo Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 12/875,571

(22) Filed: Sep. 3, 2010

(65) Prior Publication Data

US 2011/0113874 A1 May 19, 2011

(30) Foreign Application Priority Data

Nov. 16, 2009 (KR) .................. 10-2009-0110447

(51) Int. Cl.
*G01L 5/28* (2006.01)
(52) U.S. Cl. .......................................................... 73/121
(58) Field of Classification Search .................. 73/121, 73/132, 512, 513
See application file for complete search history.

(56) References Cited

U.S. PATENT DOCUMENTS

| | | | | |
|---|---|---|---|---|
| 5,408,899 A | * | 4/1995 | Stewart | 74/513 |
| 5,823,064 A | * | 10/1998 | Cicotte | 74/512 |
| 5,887,488 A | * | 3/1999 | Riggle | 74/514 |
| 6,019,016 A | * | 2/2000 | Takagi et al. | 74/513 |
| 6,263,758 B1 | * | 7/2001 | Kumamoto et al. | 74/513 |
| 6,289,762 B1 | * | 9/2001 | Silva | 74/513 |
| 6,370,983 B1 | * | 4/2002 | Nakamura | 74/514 |
| 6,505,496 B2 | * | 1/2003 | Kato et al. | 73/1.79 |
| 6,689,016 B2 | * | 2/2004 | Apel | 477/115 |
| 7,012,423 B2 | * | 3/2006 | Hasegawa et al. | 324/207.25 |

FOREIGN PATENT DOCUMENTS

| | | |
|---|---|---|
| JP | 03-067315 A | 3/1991 |
| JP | 2001-116507 A | 4/2001 |

* cited by examiner

*Primary Examiner* — Freddie Kirkland, III
(74) *Attorney, Agent, or Firm* — Morgan, Lewis & Bockius LLP

(57) ABSTRACT

A brake pedal stroke sensor apparatus may include a frame, a hinge shaft fixed to the frame, a pedal arm pivotally coupled to the hinge shaft and rotating with respect to the hinge shaft, an angle sensor that is coaxially aligned to the hinge shaft and fixed to the frame, a sensor lever connected to a rotational shaft of the angle sensor and extending with a predetermined length, and a drive pin formed to the hinge shaft in a predetermined distance from a rotational axis of the hinge shaft and engaged to a distal end portion of the sensor lever so as to transmit change of a rotary angle of the pedal arm to the angle sensor in accordance with a rotation of the pedal arm.

6 Claims, 5 Drawing Sheets

BRAKE PEDAL STROKE SENSOR

CROSS-REFERENCE TO RELATED APPLICATION

The present application claims priority to Korean Patent Application No. 10-2009-0110447 filed in the Korean Intellectual Property Office on Nov. 16, 2009, the entire contents of which is incorporated herein for all purposes by this reference.

BACKGROUND OF THE INVENTION

1. Field of the Invention

The present invention relates to a pedal brake sensor, and more particularly to a pedal brake sensor capable of improving durability and accuracy.

2. Description of Related Art

Generally, a device is provided to continuously detect a rotary angle of a pedal arm of a brake pedal, an acceleration pedal, and the like, and to precisely control according to data based on the detected data.

For example, an angle sensor detects a depressing force of the pedal arm of the brake pedal, and the resulting value is calculated based on a change of time so as to determine whether it is suddenly stopped or not. At this time, a brake assist device can be provided to increase braking performance at a time of a sudden stop.

Such an angle detector detecting the rotary angle of the pedal arm includes a conventional pedal arm, a hinge shaft supporting the pedal arm for being rotating, and an angle sensor capable of detecting a rotary angle thereof.

A separate bracket is further provided for equalizing a trace of operation between the brake pedal arm and the pedal stroke and is disposed at a shaft of the brake pedal hinge.

In mounting the sensor, loose tolerance occurs or sensing performance is deteriorated due to deterioration of a vehicle and brake pedal thereof.

Further, because the bracket is added thereto, manufacturing cost and weight is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a brake pedal stroke sensor having advantages of improving durability and accuracy.

In an aspect of the present invention, the brake pedal stroke sensor apparatus may include a hinge shaft that is fixed to a frame and having a hinge head formed at one end thereof, a pedal arm pivotally assembled to the hinge shaft such that the pedal arm is rotatable with respect to the hinge shaft, an angle sensor that is coaxially disposed with the hinge shaft, wherein the angle sensor is covered with a sensor cover and a bracket is assembled therein and wherein the bracket supports the angle sensor and connects the sensor cover to the frame, and a sensor lever fixed to a rotational axis of the angle sensor and transmitting change of a rotary angle of the pedal arm to the angle sensor by rotating with the angle sensor in accordance with a rotation of the pedal arm.

The hinge head of the hinge shaft may be disposed inside the sensor cover and the bracket.

A drive pin may be protrudedly mounted at one surface of the pedal arm and faces the angle sensor, and an elongated slot may be formed at one end of the sensor lever so that the elongated slot is symmetric with respect to the drive pin, wherein a distal end portion of the drive pin is engaged with the elongated slot of the sensor lever.

In another aspect of the present invention, the brake pedal stroke sensor apparatus may include a frame, a hinge shaft fixed to the frame, a pedal arm pivotally coupled to the hinge shaft and rotating with respect to the hinge shaft, an angle sensor that is coaxially aligned to the hinge shaft and fixed to the frame, a sensor lever connected to a rotational shaft of the angle sensor and extending with a predetermined length, and a drive pin formed to the hinge shaft in a predetermined distance from a rotational axis of the hinge shaft and engaged to a distal end portion of the sensor lever so as to transmit change of a rotary angle of the pedal arm to the angle sensor in accordance with a rotation of the pedal arm.

An elongated slot may be formed at the distal end portion of the sensor lever and a distal end portion of the drive pin is engaged thereto.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
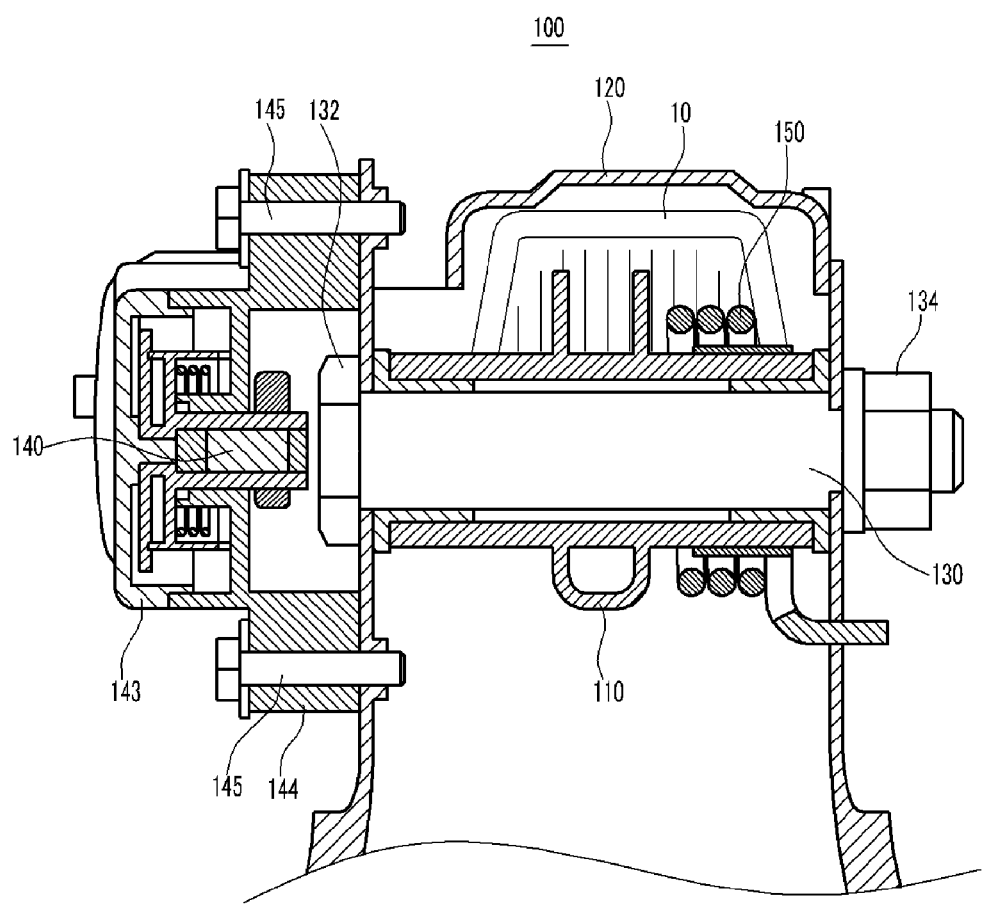
FIG. 1 shows a cross-sectional view of a brake pedal stroke sensor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 shows a cross-sectional view of a brake pedal stroke sensor according to an exemplary embodiment of the present invention.

Figure 2:
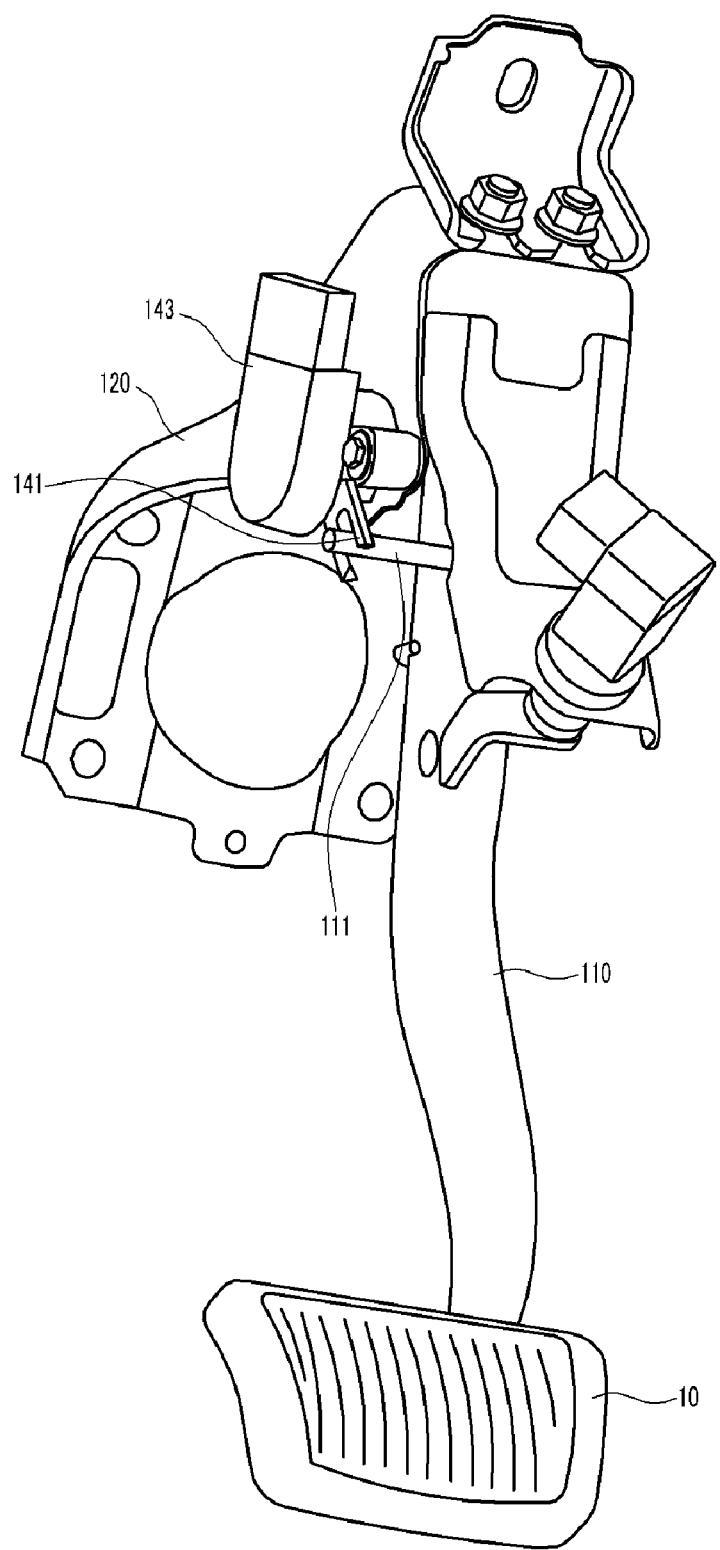
FIG. 2 shows a perspective view of a brake pedal stroke sensor according to an exemplary embodiment of the present invention.

FIG. 2 shows a perspective view of a brake pedal stroke sensor according to an exemplary embodiment of the present invention.

Figure 3:
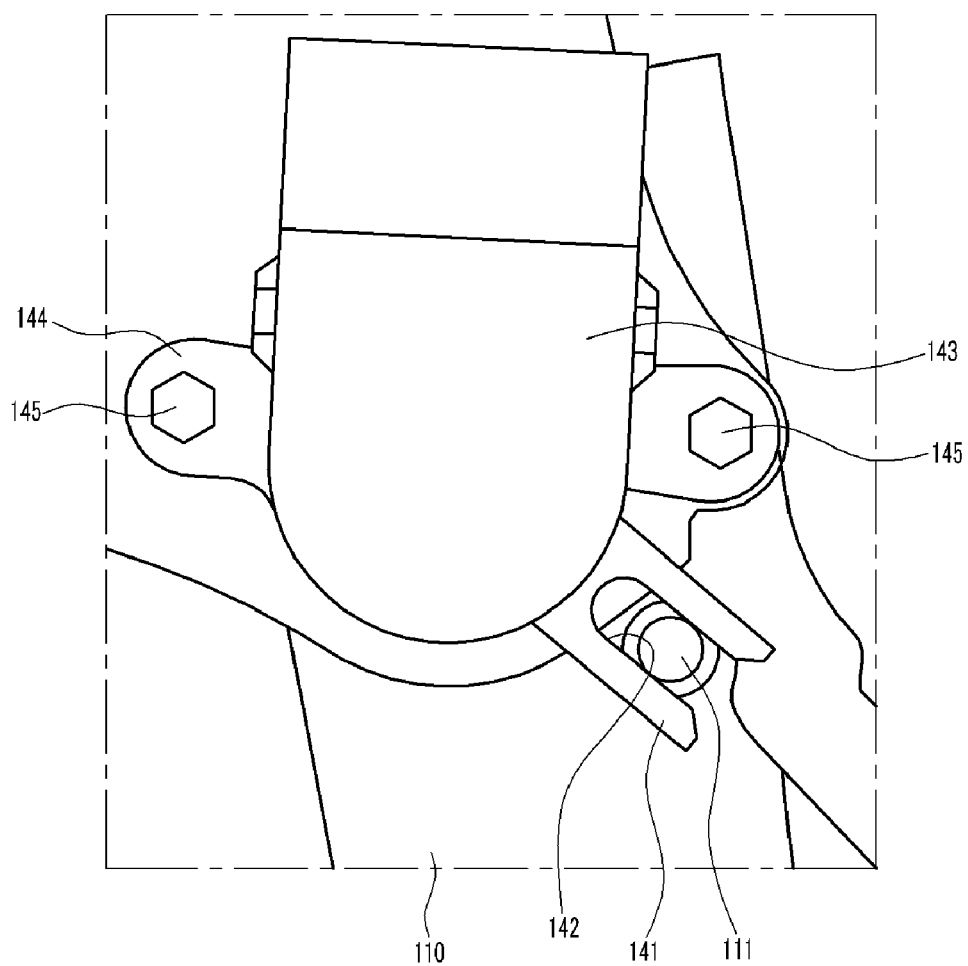
FIG. 3 shows a side view of a brake pedal stroke sensor according to an exemplary embodiment of the present invention.

FIG. 3 shows a side view of a brake pedal stroke sensor according to an exemplary embodiment of the present invention.

Figure 4:
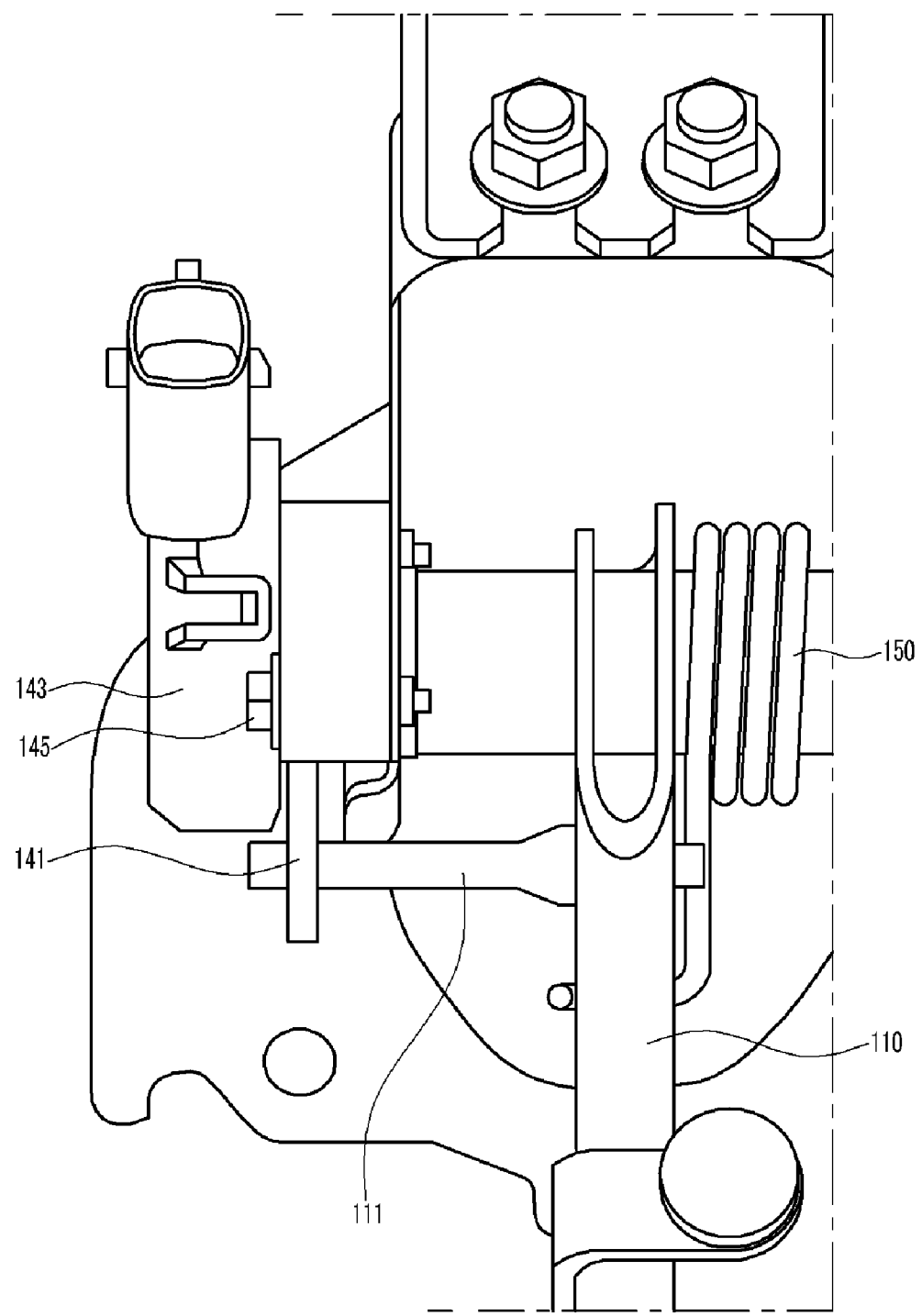
FIG. 4 shows a front view of a brake pedal stroke sensor according to an exemplary embodiment of the present invention.

FIG. 4 shows a front view of a brake pedal stroke sensor according to an exemplary embodiment of the present invention.

Figure 5:
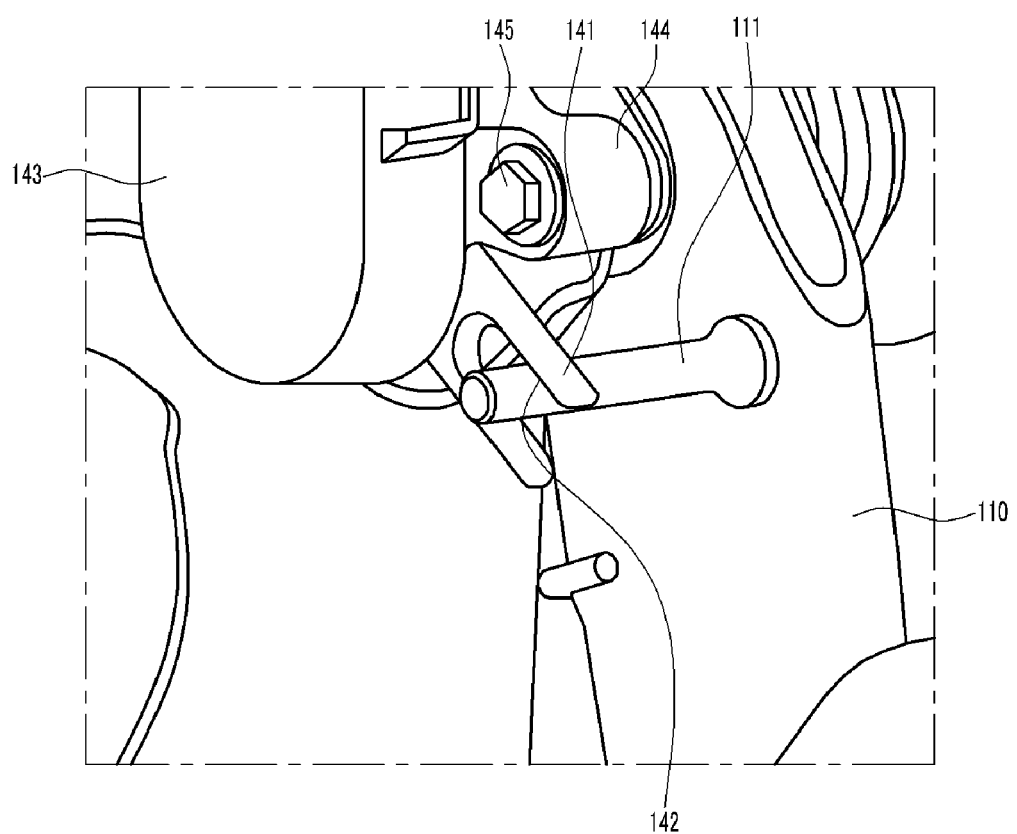
FIG. 5 shows a perspective view of a main portion of a brake pedal stroke sensor according to an exemplary embodiment of the present invention.

FIG. 5 shows a perspective view of a main portion of a brake pedal stroke sensor according to an exemplary embodiment of the present invention.

A brake pedal stroke sensor 100 according to an exemplary embodiment of the present invention detects how a depressing force is exerted on a brake pedal 10 of a vehicle.

As shown in FIG. 1 and FIG. 2, the brake pedal stroke sensor according to an exemplary embodiment of the present invention includes a pedal arm 110 with the brake pedal 10 assembled at one frontal end thereof, a hinge shaft 130 that is fixed to a frame 120 and rotatably supports the pedal arm 110 such that the pedal arm 110 can be rotated with respect to the hinge shaft 130, a sensor lever 141 that is engaged with a drive pin 111 of the pedal arm 110 and that is formed with an elongated slot, and an angle sensor 140 for detecting a rotary angle of the pedal arm 110.

The pedal arm 110 operates a brake (not shown) according to a depressing force of the brake pedal 10.

Herein, the drive pin 111 is protrudedly mounted at one surface of the pedal arm 110.

Such a drive pin 111 transmits a rotary angle of the pedal arm 110 to the sensor lever 141.

The hinge shaft 130 is penetratedly assembled in the frame 120.

The hinge shaft 130 can be a conventional bolt structure, wherein a hinge head 132 is formed at one end of the hinge shaft 130 and a nut 134 and the like is disposed at the other end thereof for being engaged at the frame 120.

Herein, the pedal arm 110 is disposed at an exterior circumference of the hinge shaft 130, and as shown in FIG. 1, the pedal arm 110 is supported by an elastic member 150 encompassing one end of the pedal arm 110 in case of rotating the pedal arm 110.

Meanwhile, one end of the sensor lever 141 is assembled at the angle sensor 140, an elongated slot 142 is formed at the other end thereof, and the drive pin 111 is inserted into the elongated slot 142 with a tight tolerance.

That is, the drive pin 111 is integrally rotated according to rotation of the pedal arm 110 and at the same time is slid along the elongated slot 142, and a rotary angle is transmitted to the sensor lever 141 through the drive pin 111.

The angle sensor 140 detects the angle through the sensor lever 141.

The angle sensor 140 can be a conventional variable resistor.

Herein, the angle sensor 140 is mounted in a bracket 144 assembled at the frame 120, and a sensor cover 143 is provided at the opposite side thereof, that is, the angle sensor 140 is mounted inside the sensor cover 143 and supported by the bracket 144.

Further, the bracket 144 is mounted at the frame 120 through a mounting bolt 145, and the angle sensor 140 is mounted in the bracket 144.

The sensor cover 143 covers the bracket 144.

Therefore, the hinge head 132 is mounted at the inside of the sensor cover 143 and the bracket 144.

An operation of a brake pedal stroke sensor according to an exemplary embodiment of the present invention will hereinafter be described in detail.

Firstly, when a driver depresses the brake pedal 10, the pedal arm 110 is rotated with respect to the hinge shaft 130.

At this time, the drive pin 111 is integrally rotated with the pedal arm 110.

Because the drive pin 111 is inserted inside the elongated slot 142 of the sensor lever 141 with a tight tolerance, it is rotated and slid along the elongated slot 142.

The angle sensor 140 then detects a change of an angle thereof due to rotation of the sensor lever 141.

In addition, the angle sensor 140 detects an angle thereof through a change of an output voltage and then calculates a rotary angle, so the angle sensor 140 is required for determining the output voltage as a predetermined value at a position of an early stage of movement of the sensor lever.

Therefore, the brake pedal stroke sensor 100 according to an exemplary embodiment of the present invention has an advantage of omitting a separate bracket in order to equalize a trace of operation between the pedal arm 110 and the angle sensor 140, so that the angle sensor 140 is disposed at the hinge shaft 130, and thus the manufacturing cost and weight can be decreased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake pedal stroke sensor apparatus comprising:
a hinge shaft that is fixed to a frame and having a hinge head formed at one end thereof;
a pedal arm pivotally assembled to the hinge shaft such that the pedal arm is rotatable with respect to the hinge shaft;
an angle sensor that is coaxially disposed with the hinge shaft, wherein the angle sensor is covered with a sensor cover and a bracket is assembled therein and wherein the bracket supports the angle sensor and connects the sensor cover to the frame; and
a sensor lever fixed to a rotational axis of the angle sensor and transmitting change of a rotary angle of the pedal arm to the angle sensor by rotating with the angle sensor in accordance with a rotation of the pedal arm, wherein the hinge head of the hinge shaft is disposed inside and covered by the sensor cover and the bracket.

2. The sensor apparatus of claim 1, wherein a drive pin is protrudedly mounted at one surface of the pedal arm and faces the angle sensor, and an elongated slot is formed at one end of the sensor lever so that the elongated slot is symmetric with respect to the drive pin, and wherein a distal end portion of the drive pin is engaged with the elongated slot of the sensor lever.

3. The sensor apparatus of claim 1, wherein the angle sensor is coaxially disposed with the hinge shaft and spaced from the hinge shaft in a horizontal direction.

4. A brake pedal stroke sensor apparatus comprising:
a frame;
a hinge shaft fixed to the frame;
a pedal arm pivotally coupled to the hinge shaft and rotating with respect to the hinge shaft;
an angle sensor that is coaxially aligned to the hinge shaft and fixed to the frame;
a sensor lever connected to a rotational shaft of the angle sensor and extending with a predetermined length; and
a drive pin formed to the hinge shaft in a predetermined distance from a rotational axis of the hinge shaft and engaged to a distal end portion of the sensor lever so as to transmit change of a rotary angle of the pedal arm to the angle sensor in accordance with a rotation of the pedal arm.

5. The sensor apparatus of claim 4, wherein an elongated slot is formed at the distal end portion of the sensor lever and a distal end portion of the drive pin is engaged thereto.

6. The sensor apparatus of claim 4, wherein the angle sensor is coaxially disposed with the hinge shaft and spaced from the hinge shaft in a horizontal direction.

* * * * *